(12) United States Patent
Friesen et al.

(10) Patent No.: US 6,892,080 B2
(45) Date of Patent: May 10, 2005

(54) BOOSTER AMPLIFIER FOR CELLULAR TELEPHONE CRADLES

(75) Inventors: Elwood Dalen Grant Friesen, Winnipeg (CA); Wybrandus Theodore Schellekens, Winnipeg (CA)

(73) Assignee: Arrista Technologies, Inc., Winnipeg (CA)

( * ) Notice: Subject to any disclaimer, the term of this patent is extended or adjusted under 35 U.S.C. 154(b) by 708 days.

(21) Appl. No.: 09/995,291

(22) Filed: Nov. 27, 2001

(65) Prior Publication Data

US 2003/0100351 A1 May 29, 2003

(51) Int. Cl.[7] .......................... H04B 1/04; H04B 17/02
(52) U.S. Cl. ................ 455/571; 455/127.2; 455/127.3; 455/136; 455/138
(58) Field of Search .......................... 455/569.1, 569.2, 455/571, 575.6, 575.9

(56) References Cited

U.S. PATENT DOCUMENTS

| 4,636,741 A | 1/1987 | Mitzlaff |
| 4,972,346 A | * 11/1990 | Kawano et al. ................ 455/9 |
| 5,109,541 A | * 4/1992 | Park ........................... 455/571 |
| 5,291,147 A | 3/1994 | Muurinen |
| 5,457,814 A | 10/1995 | Myrskog et al. |
| 5,659,594 A | * 8/1997 | Toda ........................ 455/550.1 |
| 6,029,074 A | 2/2000 | Irvin |
| 6,175,748 B1 | 1/2001 | Aboukhalil et al. ........ 455/571 |
| 6,230,031 B1 | 5/2001 | Barber ........................ 455/571 |
| 6,690,915 B1 | * 2/2004 | Ito et al. ........................ 455/7 |

FOREIGN PATENT DOCUMENTS

| EP | 0 392 132 A2 | 10/1990 | ........... H04B/7/005 |
| EP | 0 589 574 A1 | 3/1994 | ............ H03G/3/20 |

* cited by examiner

Primary Examiner—Rexford Barnie
Assistant Examiner—Tuan Pham
(74) Attorney, Agent, or Firm—Nikolai & Mersereau, P.A.

(57) ABSTRACT

A booster amplifier that can be coupled to virtually any cellular telephone handset is provided for use with virtually any cellular communications network. The power output of the booster amplifier is dynamically controlled based upon signals received from the handset to improve the quality and range of communications between the handset and the base stations of the cellular network without interfering with normal communications between the cellular network and other handsets.

9 Claims, 7 Drawing Sheets

| Mobile Station Power Level (PL) | Nominal ERP for Mobile Station Power Class (dBm) | | |
|---|---|---|---|
| | I | II | III |
| 0 | 36 | 32 | 28 |
| 1 | 32 | 32 | 28 |
| 2 | 28 | 28 | 28 |
| 3 | 24 | 24 | 24 |
| 4 | 20 | 20 | 20 |
| 5 | 16 | 16 | 16 |
| 6 | 12 | 12 | 12 |
| 7 | 8 | 8 | 8 |

Figure 6

| Band Class | Mobile Station Class | Lower Limit | | Upper Limit | |
|---|---|---|---|---|---|
| | | ERP (dBm) | ERP (W) | ERP (dBm) | ERP (W) |
| 0 | Class I | 31 | 1.25 | 38 | 6.3 |
| 0 | Class II | 27 | 0.5 | 34 | 2.5 |
| 0 | Class III | 23 | 0.2 | 30 | 1.0 |

Figure 7

BOOSTER AMPLIFIER FOR CELLULAR TELEPHONE CRADLES

BACKGROUND OF THE INVENTION

I. Field of the Invention

The present invention relates to cellular telephone communications and cradle systems for cellular handsets that allow a customer to use the handset in a hands-free mode such as when driving a motor vehicle. More specifically, the present invention relates to an apparatus and process for dynamically controlling the power output of a booster amplifier that can be used in combination with virtually any such cradle.

II. Brief Description of the Prior Art

Over the past decade, use of cellular telephones has become widespread. The use of a cellular telephone handset while driving creates certain risks. First, such use can distract the driver. Second, one hand must be used to hold the phone to the ear and mouth, leaving only one hand to operate the motor vehicle. Such use presents sufficient risks that it has been outlawed in several jurisdictions.

Recognizing these risks, various manufacturers have begun to provide accessories that permit hands-free use of a cellular telephone handset while driving. Generally speaking, the solutions offered by these manufacturers take one of two forms. The first is a headset including an earpiece and a microphone that the driver can plug into the handset and wear while talking. Use of the headset allows the driver to operate the vehicle with both hands. The second is a cradle that includes a microphone and speaker into which the handset is placed. The microphone and speaker again allow the driver to carry on a conversation and use both hands to drive.

Cradle systems offer various advantages over headsets. First, a real issue with cellular telephones is the need to conserve the draw of electricity from the telephone's battery. Many cradles not only provide a separate power source, but also have the ability to recharge the battery of the handset.

Second, cradle systems connect to external antennas to increase range and signal quality. Further improvements can be made by amplifying the signals from the phone using a booster amplifier.

Most cellular telephones conserve battery power by reducing the power of the handset's transmitter to the lowest level that will still provide active effective communication. This is achieved by modulating the power output of the handset. More specifically, the base station controlling the cell in which the handset is located measures the strength of the incoming signal it receives from the handset. The base station then issues an instruction to the handset and the power output is adjusted to the lowest level adequate to maintain communications. Such operation does reduce consumption of battery power and also reduce interference between various handsets in the cell. However, it does exacerbate the chance of "dropped calls". Dropped calls are annoying to the user of the handset and expensive for the cellular telephone network operator. Dropped calls occur when the signal is lost between the handset and the base station. This problem is particularly acute in cities where building can block the signal path and power adjustments are not made quickly enough. This same problem can occur when the user of the handset is traveling at high speeds through rolling countryside.

The prior art includes efforts to ameliorate this problem by boosting RF power. Four methods of boosting power when using a cradle have been described in the prior art. The four prior art cradle based, power-boosting techniques will be discussed in the context of the AMPS cellular telephone network used in North America. In the AMPS system there are three classes of cellular telephones. Class I telephones operate at a maximum power of 6 dBW. Class II telephones operate at a maximum power of 2 dBW. Class III telephones operate at a maximum of −2 dBW. Most handsets operate as Class III telephones to conserve battery power.

The first prior art technique to boost power of the Class III telephones is to provide the cradle with a second RF power amplifier. When the handset is placed in the cradle, the cradle's amplifier is activated so that the handset and the cradle work together as a Class I device. The amplifier in the cradle boosts the maximum RF power output to about 3.0 watts and thus provides a 7 dB advantage over a 0.6 watt handset. Such a cradle arrangement is shown in U.S. Pat. No. 5,457,814 to Markku Myrskog et al dated Oct. 10, 1995. A real problem exists, however, with the power boost system discussed in the Myrskog et al patent. It does not have universal application and a specific handset must be used with the cradle. It does not disclose a universal boost system.

The second prior art technique to boost power involves providing the handset with a second RF power amplifier. The handset senses when it is placed in the cradle and activates the second amplifier. This changes the handset from a Class III device operating at 0.6 watts to a Class I device operating at 3.0 watts. This technique is discussed in U.S. Pat. No. 4,636,741 to James E. Mitzlaff dated Jan. 13, 1987. Again, a special handset is required and the cradle cannot be used to boost the power of any handset.

The third prior art technique is, perhaps, the simplest and least expensive of the four. When the handset is placed in the cradle, the handset increases its power to the maximum permitted for Class III operation. At the same time, the power control circuitry is disabled so the power output is not modulated in response to control signals issued by the base station to the handset. This can lead to significant interference with other handsets.

A fourth technique is disclosed in U.S. Pat. No. 6,029,074 to David R. Irvin dated Feb. 22, 2000. This patent discloses a handset that is set up to operate as a Class II telephone. It has control logic that allows it to modulate its power output in response to power attenuation signals it receives from the base station of the cellular systems. The control logic is also designed so that when the handset is not in the cradle, the power output cannot exceed a predetermined maximum value even if the attenuation signal received from the base station calls for a higher output. Thus, the handset acts very much like a Class III telephone when not in the cradle with the power output capped at −2 dBW and like a Class II telephone when in the cradle with a maximum power output of 2 dBW or about 1.6 W.

Those working in the field understand that generating a signal with higher power will reduce the number of dropped calls. Simply boosting the power, however, creates other problems such as interference with other cellular telephones and interference with normal cellular network operations. While telephones such as those disclosed in U.S. Pat. No. 6,029,074 would address some of these problems to a limited degree, such solutions still limit the dynamic range of the handset. Interference with other handsets and normal network operations remain a possibility. Other problems associated with use of a cradle are simply not addressed. These include the inherent loss of RF power between the handset's antenna and the cradle's coupling device and the loss in signal strength due to the length of cable from the cradle to the external antenna. Also, the AMPS system is not the only type of network used. A properly designed cellular booster amplifier is needed for CDMA, TDMA, PCS, GSM and iDEN network applications as well. The booster amplifier must be designed to work with analog, spread spectrum and other digital networks. There is also a need to provide a system that can accommodate many different kinds of handsets, even those that do not have the control logic of the type discussed above or internal amplifiers that permit the handset to operate as a Class I or Class II device.

SUMMARY OF THE INVENTION

A principal object of the present invention is to provide a booster amplifier that enhances the performance of a cellular telephone while operating a motor vehicle.

Another object of the present invention is to provide a booster amplifier system that interfaces with a cellular telephone handset or cradle which addresses the inherent loss of RF power between the handset's antenna and the cradle's coupling device.

Another object of the invention is to provide such a booster amplifier system that also addresses the inherent loss of RF power between the antenna of the handset and the length of cable that extends from the cradle to the external antenna.

Still another object of the present invention is to provide a booster amplifier to increase the range of the cellular telephone and reduce the number of dropped calls.

A further object of the present invention is to provide an amplifier capable of operating with a wide variety of cellular telephone handsets and cradles.

Still a further object of the present invention is to provide such a booster amplifier that will work in conjunction with a variety of cellular network types including AMPS, CDMA, TDMA, PCS, GSM and iDEN networks.

Another object of the present invention is to provide such a booster amplifier that does not disable the handsets dynamic power control, but instead uses the varying transmit power of the handset as an indication of the amount of boost required.

Still another object of the present invention is to meet all of the foregoing objectives, and reduce the number of dropped calls without interfering with the operation of other cellular telephones or the cellular network.

These and other objects are achieved by providing a booster amplifier designed to operate with a number of cradles and/or handsets. The booster amplifier can also be connected to a cradle specially designed to work with a particular style of handsets. The booster amplifier will boost the handset's signal to produce up to 2 W and is designed so that its power output is controlled by the closed-loop power control of the handset. Thus, when the handset receives a control signal from the network's base station, the booster amplifier modulates its output accordingly. The present invention incorporates a method for separating the transmit and receive circuitry, thus minimizing cross-talk interference between the transmit and receive paths. The transmit and receive circuits are separated from each other by their own respective ground planes.

BRIEF DESCRIPTION OF THE DRAWINGS

FIG. 3 is a graph showing the transfer function of the booster amplifier showing the range of gain the booster amplifier will adjust to.

FIG. 6 is a table reproduced from the TIA/EIA-553-B Mobile Station—Base Station Compatibility Standard showing the power level to be generated by Class I, Class II and Class III mobile telephones in response to eight different control signals generated by the base station.

FIG. 7 is a table based upon the TIA/EIA-98-D specification showing the power limits of Class I, Class II and Class III mobile telephones.

BRIEF DESCRIPTION OF THE INVENTION

Figure 1:
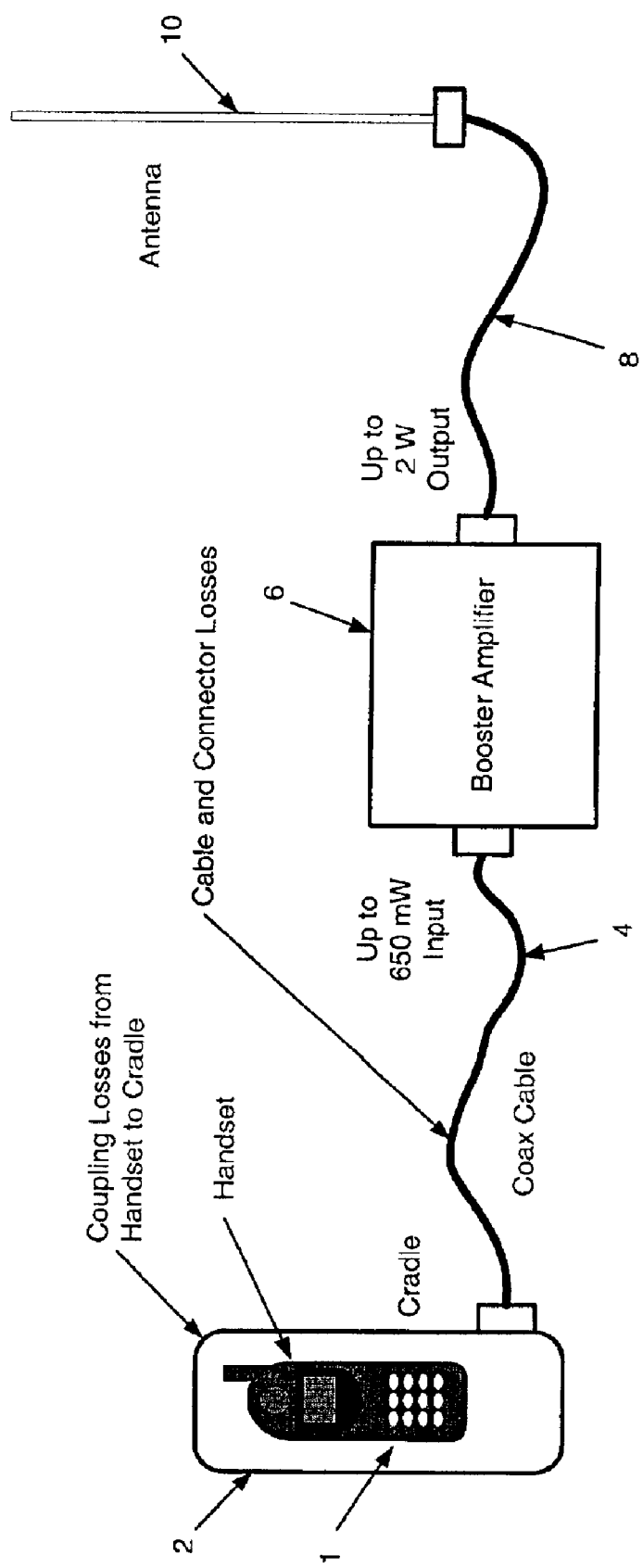
FIG. 1 is a schematic diagram of the preferred embodiment of the present invention.

The present invention is intended to be used in connection with various types of cellular communications networks. As shown in FIG. 1, the invention includes a telephone handset 1 which can be mounted in a cradle 2. The cradle includes a speaker and microphone (not shown) so that when the handset 1 is placed in the cradle 2, it can be used in a hands-free mode.

The cradle 2 is coupled by a coaxial cable 4 to a booster amplifier 6. The booster amplifier 6 is coupled by a second coaxial cable 8 to an antenna 10. The cradle 2, booster amplifier 6 and antenna 10 will typically be permanently mounted to a motor vehicle.

The booster amplifier 6 is designed to be universal, i.e. accommodate many different kinds of handsets 1 and work with virtually any commercial cellular network. Various cradles 2 may be used with this system. The cradle may have a direct RF connection to the handset or it may be inductively coupled. The booster amplifier 6 will operate for input power levels from 0–650 mW (28 dBm) so it can work with handsets 1 having maximum output power levels ranging from less than 8 to 28 dBm. The amplifier 6 is designed so that it can boost a signal to 2 W (33 dBm) within a range of input power spanning 30 mW (15 dBm) to 650 mW (28 dBm). The wide input range of the booster amplifier 6 also assists with variable loss due to coupling variations to the cradle 2, connectors, and cables 4 and 8 used as part of the system.

Figure 2:
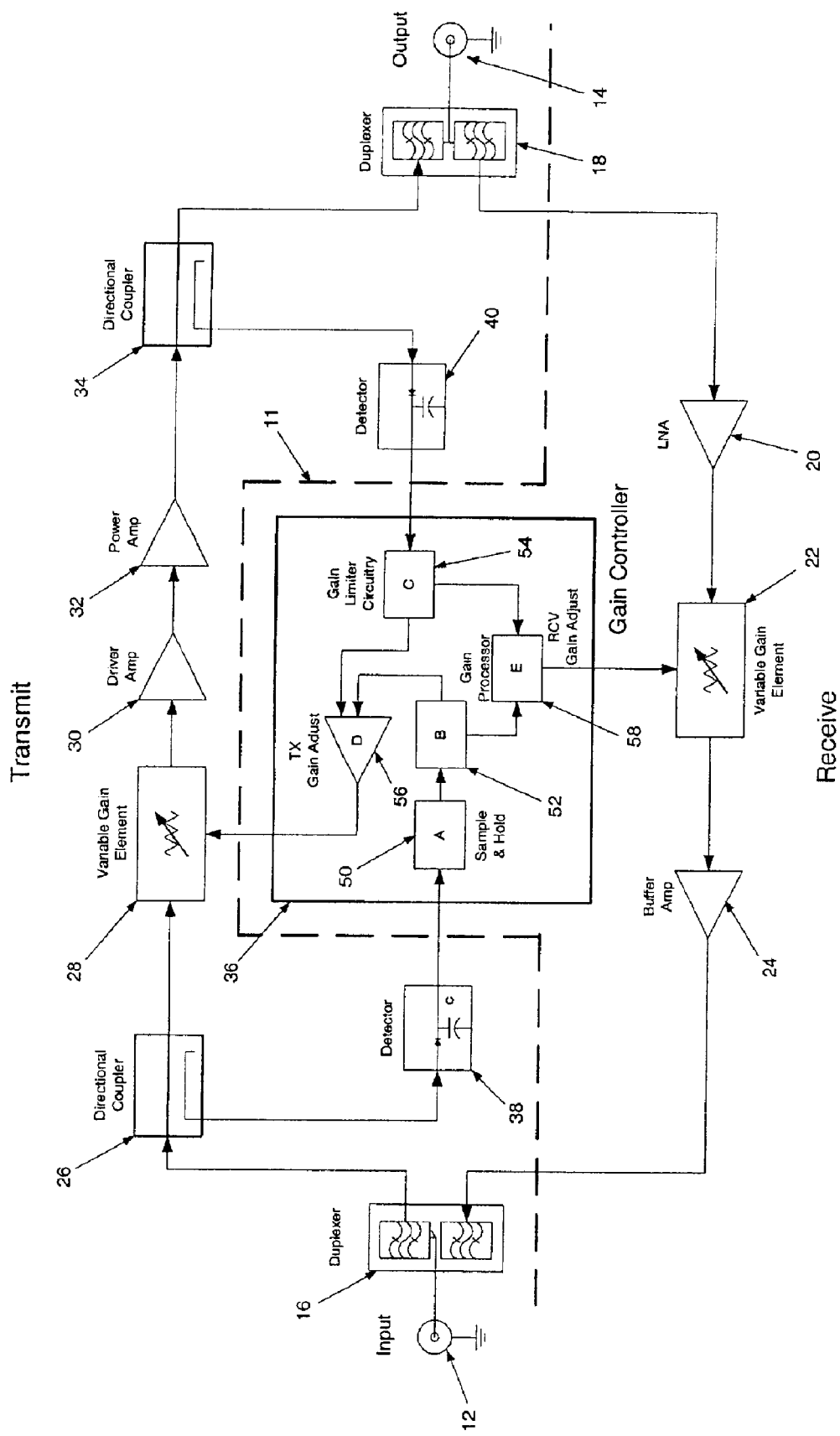
FIG. 2 is a block diagram of the booster amplifier of the present invention.

FIG. 2 is a block diagram showing the manner in which the booster amplifier 6 is constructed. The booster amplifier 6 has a connection 12 that is used to connect the cradle 2 to the booster amplifier 6. The booster amplifier 6 has a connection 14 to which the antenna 10 is connected. A duplexer 16 is provided on the cradle side and a duplexer 18 is provided on the antenna side. The duplexers 16 and 18 are provided so that two-way communication between the handset 1 and cradle 2 on the one hand and a cell tower base station via the antenna 10 on the other hand can occur. The booster amplifier has two sides, a receive side and a transmit side.

As signals are received from the base station by the antenna 10, they pass through the connection 14 and duplexer 18 to the receive side. These signals then follow a path through a low noise amplifier 20, a gain element 22, a buffer amplifier 24, the duplexer 16 and the connection 12 to the cradle 2 and handset 1. The gain element 22 can provide either a fixed or a variable gain. Received signals can include either analog or digital voice communication signals. Such signals also include control signals such as signals from the base station instructing the handset 1 to modify its power output.

Signals generated by the handset 1 and cradle 2 follow a different path through the transmit side. These signals pass through the connection 12 and duplexer 16. They then pass through the directional coupler 26, the variable gain element 28, the driver amplifier 30, the power amplifier 32, and a second directional coupler 34 before passing through the duplexer 18 and connection 14 for transmission by the antenna 10 to a cell system base station.

An important aspect of the invention relates to the manner in which the variable gain elements 22 and 28 are controlled. The booster amplifier 6 includes a gain controller 36. The gain controller 36 receives inputs from a pair of sensors. As shown, these sensors include the directional couplers 26 and 34 and the associated detectors 38 and 40. Detector 38 senses voltages at the directional coupler 26 on the input side of the variable gain element 28. Detector 40 senses voltages at the directional coupler 34 on the output side of variable gain element 28. Logic associated with the gain controller 36 processes the signals received from the two detectors 38 and 40 to control the variable gain elements 22 and 28. Another important aspect of the design of amplifier 6 is the separation of the transmit path from the receive path by a ground plane 11. This prevents cross-talk interference between the circuitry of the transmit path and the circuitry of the receive path.

As shown in FIG. 2, the gain controller 36 has a sample and hold circuit 50 that will retain the maximum input signal level while the amplifier is powered. Signals are delivered to the sample and hold circuit 50 by the detector 38. The gain controller also has a gain processor 52 that adapts the gain of the amplifier to the signal measured by the sample and hold circuit 50. The gain controller 36 also has a limiter circuit 54 that monitors the output of the power amplifier 32. Specifically, limiter circuit 54 receives signals from detector 40 and uses these signals to limit the maximum power output of the booster amplifier 6. This serves to prevent intermodulation distortion and to keep the maximum output power within regulatory limits such as those imposed by the Federal Communications Commission of the U.S. government. Logic circuit 56 receives signals from both the gain processor 52 and the limiter 54 and allows the limiter 54 to override the gain processor 52 so as to limit the maximum output power. Logic circuit 56 sends signals to the variable gain element 28 to control the gain provided by the booster amplifier. It also sends signals to control circuit 58 which is used to program the variable gain element 22 in the receive path gain to mirror the transmit gain. This creates a balance in the system of the present invention and minimizes errors in open-loop gain control estimations by the handset 1.

As set forth in the background of the invention, cell system base stations continually send control signals to handsets operating with the range of coverage of the base station. These control signals are used by the handset to control the power output of the handset 1. When the apparatus of the present invention is used, these control signals are received by the antenna 10 and pass through the booster amplifier 6 to the cradle 2 and handset 1. In response to these control signals, the handset adjusts the power of its output signals. As output signals of the handset 1 pass back through the booster amplifier 6, their power level is sensed by the directional coupler 26 and detector 38. When these signals reach the variable gain element 28, they are adjusted to the desired level based upon instructions the variable gain element 28 receives from the gain controller 36. The signals then pass through the amplifier, directional coupler and duplexer and out through the antenna 10.

Figure 3:
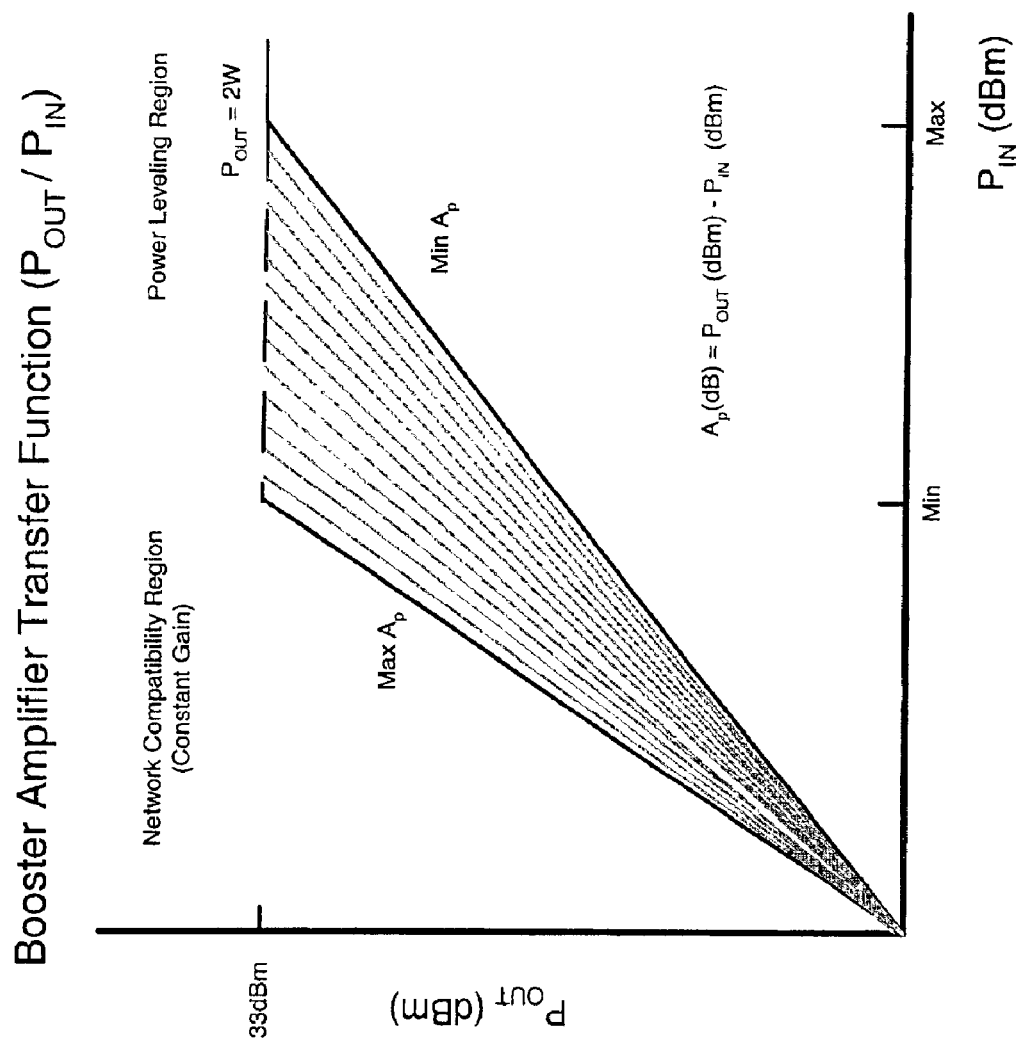

With the foregoing discussion in mind, the manner in which the booster amplifier 6 boosts the signals will be discussed in greater detail with reference to FIGS. 3–5. As reflected in FIGS. 3–5, the gain controller 36 of the booster amplifier 6 performs several important functions.

Figure 4:
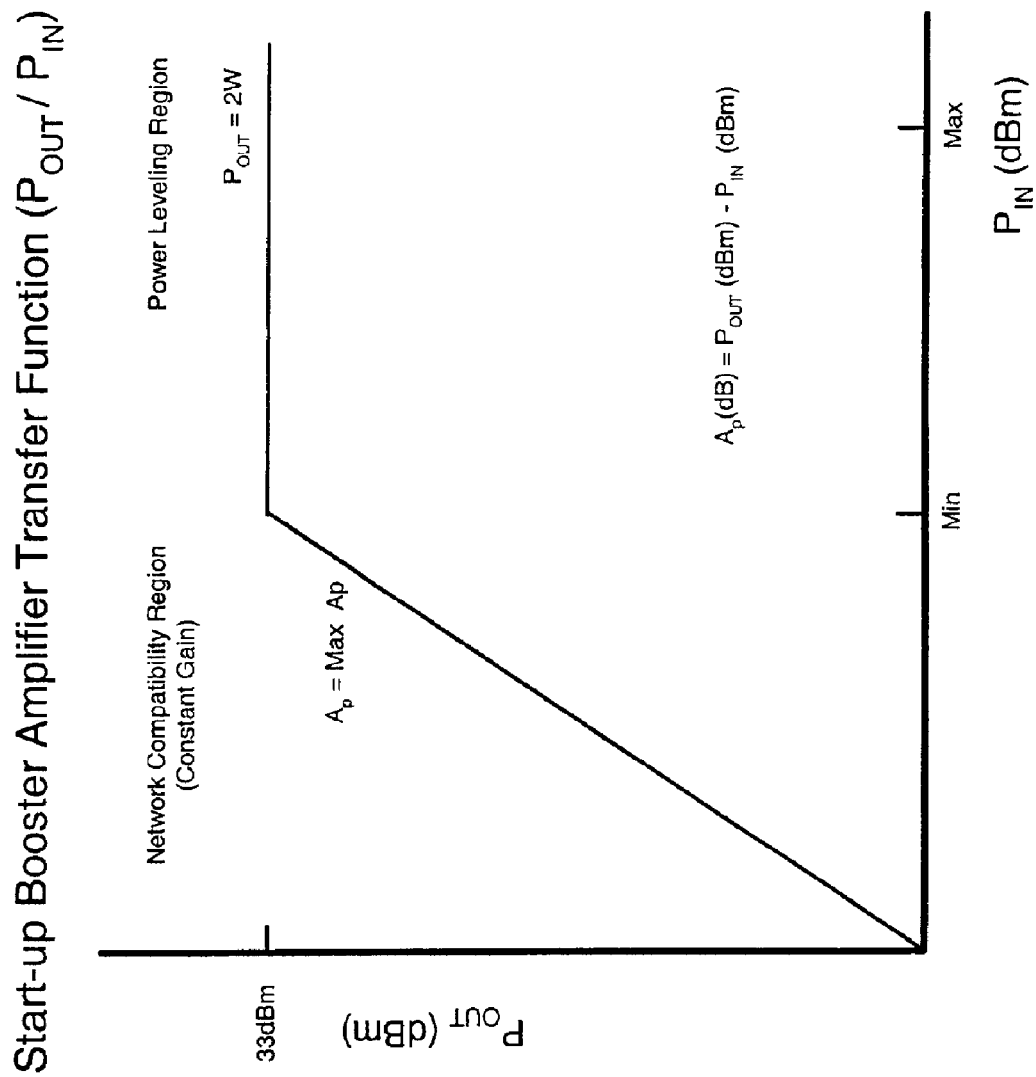
FIG. 4 is a graph showing the transfer function of the booster amplifier at start-up.

As shown in FIG. 4, when the booster amplifier 6 is powered up, it operates at maximum gain to accommodate low power handsets 1 or handsets with poor coupling into the cradle 2. The gain controller 36 detects the maximum input power to the booster amplifier 6 from the handset 1 and dynamically adjusts the variable gain element 22, so as to maximize operation of the booster amplifier 6 in the gain leveling region. This allows the handset 1 to operate with its full dynamic power control range, while achieving up to the maximum power output level of the booster amplifier 6 when required to reach a cellular base station. The gain controller 36 will not increase the gain until the booster amplifier 6 is reset. Whenever the booster amplifier 6 is reset, the gain is reset to the maximum of 18 dB. This is desirable because the conditions presented to the booster amplifier 6 input from the handset 1 are unpredictable. The user may switch handsets or the handset 1 may no longer be seated properly within the cradle 2.

Figure 5:
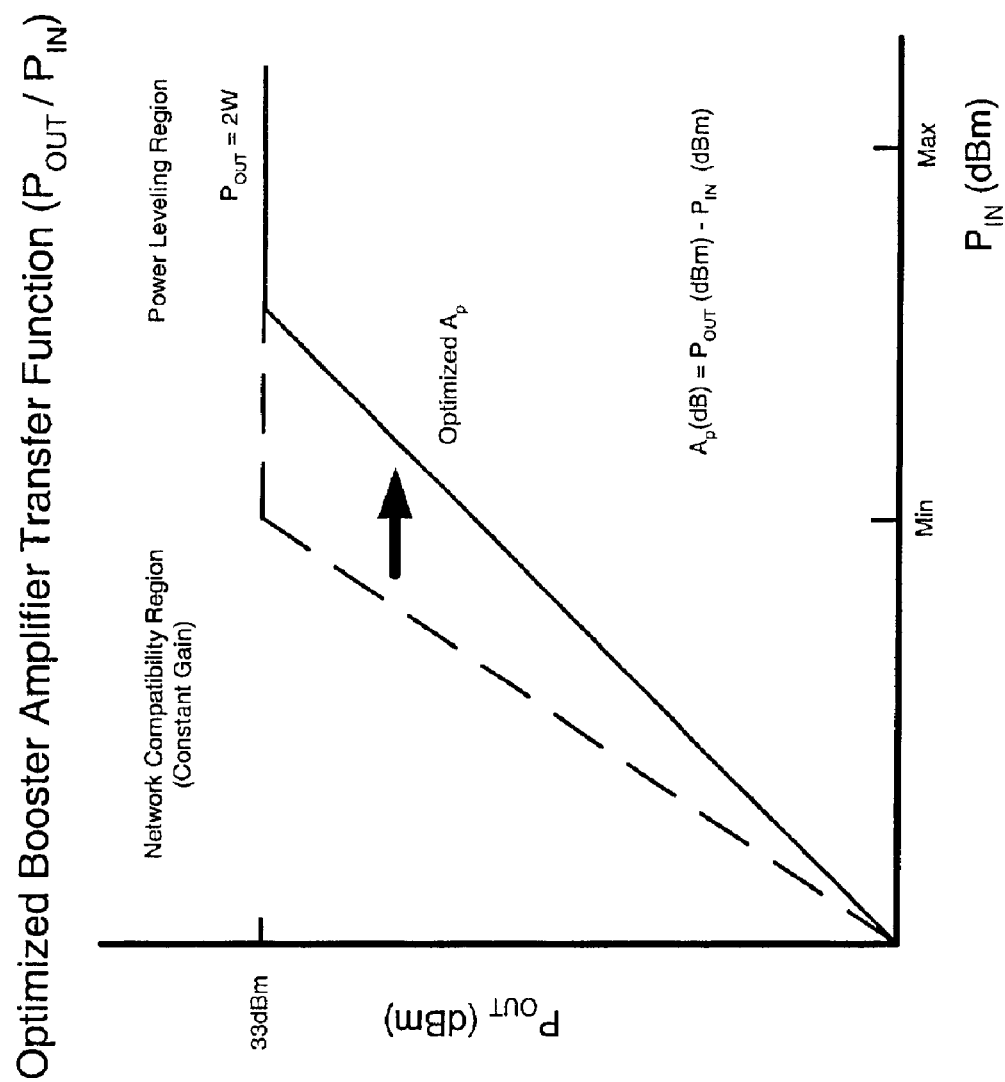
FIG. 5 is a graph showing the optimized amplifier transfer function.

FIG. 5 is a graph showing the manner in which the power transfer function of the booster amplifier 6 is optimized. Once the handset 1 begins transmitting, the booster amplifier 6 detects the maximum input power it receives from the handset 1. Specifically, the input power is received at the directional coupler 26, sensed by detector 38 and supplied to the sample and hold circuit 50 of the gain controller 36. If the output power is being limited, the gain controller 36 will reduce the total gain through decreasing the variable gain element 28.

The foregoing arrangement is superior to the use of a simple amplifier with a fixed gain that provides only limited output control. The system of the present invention ensures that the booster amplifier 6 will not operate in the power-leveling region.

With the foregoing in mind, the operation of the preferred embodiment will be discussed in connection with an 800 MHz AMPS Class III handset 1. The maximum output power of a typical Class III handset 1 is 0.6 W. The present invention can be used to make the handset 1 operate either as a Class I handset with a maximum power output of 4.0 W or a Class II handset with a maximum power output of 1.6 W.

In an AMPS network, the step size specified is 4 dB. FIG. 6 is reproduced from the TIA/EIA-553-B Mobile Station—Base Station Compatibility Standard for AMPS cellular networks. In such a network, the base station sends out signals representative of 8 different power levels (numbered 0–7 in the FIG. 6). The table also shows the power levels Class I, Class II and Class III handsets operate at in response to such signals. As indicated in the table, all three classes of handsets operate at the same power level when the base station sends a code 2 through a code 7. For example, when a code 2 is sent all three classes of handsets operate at 28 dBm. However, when a code 1 is issued, a Class III handset continues to operate at 28 dBm while Class I and Class II handsets operate at 32 dBm. Similarly, when a code 0 is issued, Class III handsets operate at 28 dBm, Class II handsets at 32 dBm and Class I handsets at 36 dBm.

When a handset 1 first registers with the cellular network, it will transmit at maximum power (i.e. 0.6 W for a Class III handset). When the handset 1 is coupled to the cradle 2, the gain controller 36 booster amplifier 6 will set the gain of variable gain element 28 according to the power level at which the handset 1 is operating. When the base station sends the first power control command instructing the handset to reduce power (by 4 dB), the output power level of the amplifier will be 4 dB lower, as it is operating in its network compatibility region (constant gain region).

When a Class III handset is used in an AMPS environment with the present invention, the booster amplifier operates at 33 dBm at power up and is registered by the network as a Class II device. If the base station sends a signal to the handset instructing a drop in power by 4 dB, in response to this signal, the handset 1 will change its output power and thus the output of the amplifier 6 will also drop by 4 dB. This is within the measurable tolerances of the maximum power level expected at the base station.

CDMA cellular networks differ from AMPS networks with respect to power control. In CDMA networks, power control is performed using two different methods—open-looped estimation performed by the handset and close-loop correction involving both the base station and the handset. When the handset first registers with the network, it uses open-loop power control. The handset bases its transmit power level on the received signal strength from the base station. Later, closed-loop power control commences. The base station sends control signals every 1.25 ms to the handset. These signals may instruct the handset to increase power, decrease power or keep the power level constant. The power increments are not always the same as is the case in AMPS networks. In CDMA networks the increments may be 1.0 dB, 0.5 dB or 0.25 dB. The lower and upper limits of the power ranges for Class I, Class II and Class III handsets used in a CDMA network are set forth in FIG. 7.

The CDMA closed-loop power control mechanism is more precise and offers quicker response times than the AMPS system. The requirements of the CDMA system are readily handled by the present invention. Since booster amplifier 6 has a linear gain characteristic, the finer power increments of the CDMA network are preserved at the output of the booster amplifier 6. While the booster amplifier 6 may not have set the optimum gain at start-up, this does not have a negative effect on the network because the gain controller 36 reacts quickly so that the closed-loop power control is accurately maintained. Further, the full range of power control remains available.

Various advantages are provided by the present invention whether used with an AMPS network, a CDMA network or some other type of network. A principle advantage is that the present invention can be used with any Class III handsets and all possible transmit power levels from such handsets. The booster amplifier 6 reacts to the power level coming from the handset 1 to confirm to the network constraints and enhances the power control dynamic range. The booster amplifier 6 limits its output power to 2 W (33 dBm), and creates no intermodulation distortion.

Another significant advantage is that use of a handset 1 with the booster amplifier 6 within the service area will not interfere with other handsets used by other network users. The booster amplifier 6 will not always be transmitting at its full output power, but rather at the level determined by the network's closed-loop power control system.

Figure 8:
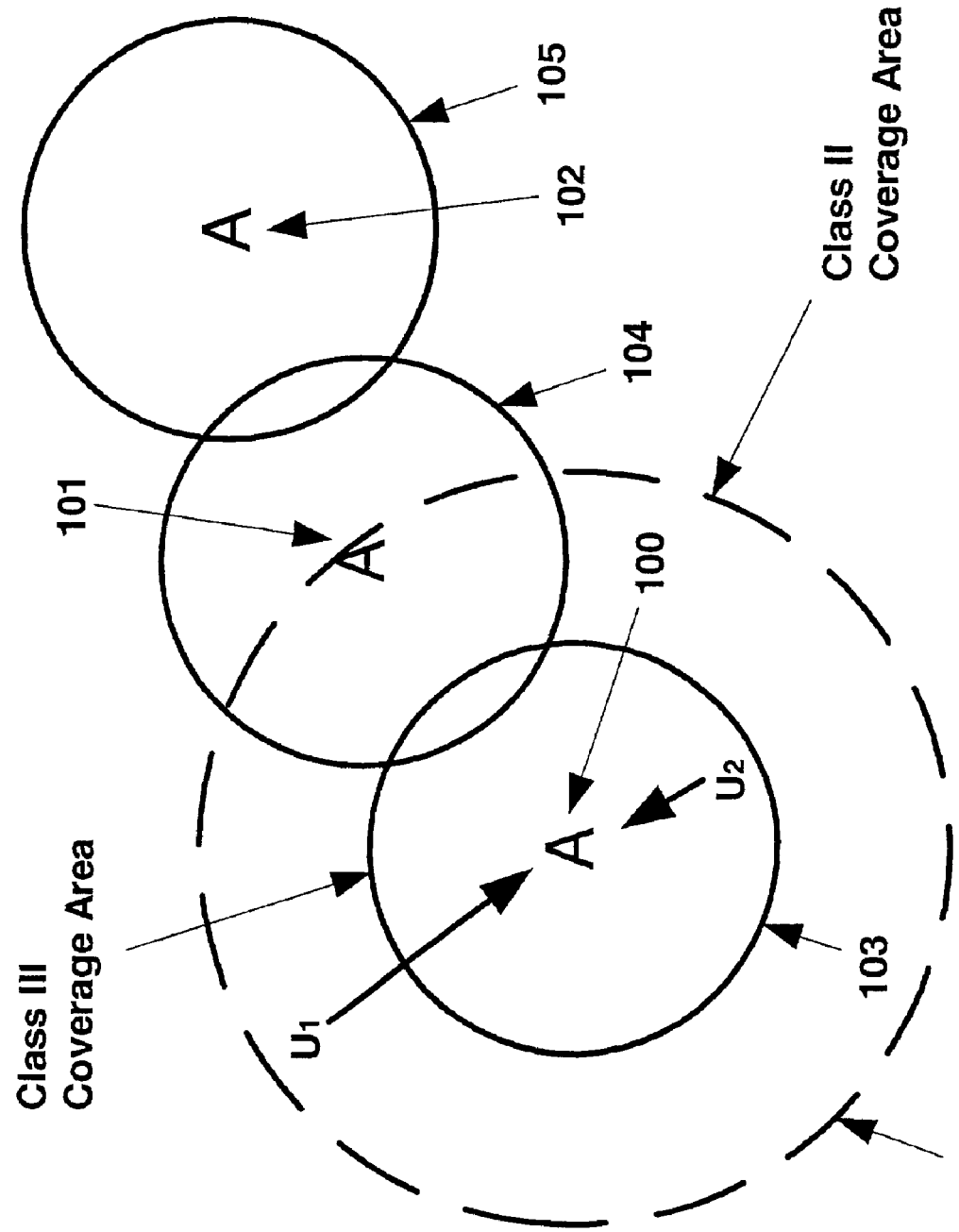
FIG. 8 is a diagram showing how the present invention can allow for boosted communication even from geographic areas in which normal Class III handsets cannot communicate to a base station.

Still other advantages are provided when a user is outside the network service area for Class III handsets. FIG. 8 shows a situation where a network has three separate base stations 100, 101 and 102 covering three separate geographical areas 103, 104 and 105 in which Class III handsets can successfully be used. A user ($U_1$) equipped with both a handset 1 and the booster amplifier 6 is located outside of any of the areas of coverage 103, 104 and 105 in which a Class III handset can communicate with a base station 100, 101 or 102. Use of the booster amplifier 6, however, allows the user ($U_1$) to communicate with the base station 100 because the booster amplifier 6 and handset 1 will work together to provide the power of a Class II handset, allowing it to operate anywhere in the Class II coverage area 106. More significantly, the signal from another user ($U_2$) operating within the normal coverage area 103 will not be affected by the boosted signal delivered by the booster amplifier 6 being used by user ($U_1$). This is because base station 100's power control loop balances the received spectrum from all users in communication with the base station.

These and other advantages are all achieved through the use of the present invention that, of course, may be modified without deviating from its true scope. The foregoing discussion has been provided to meet the disclosure requirements of the patent laws. It is not intended to be limiting. The scope of the invention is, of course, defined by the following claims.

It is claimed:

1. A boost system for enhancing communication between a cellular telephone and a network base station comprising:
   a. a cradle that couples a cellular telephone handset to the power boost system;
   b. an antenna; and
   c. a booster amplifier electrically coupled to said cradle and said antenna, said booster amplifier having a receive side, a transmit side and a gain controller, said receive side having a low noise amplifier, a gain circuit and a buffer amplifier through which signals received from the base station are passed to the cradle and a cellular telephone coupled thereto, said transmit side having a first directional coupler and a detector which transmit a signal indicative of the cellular telephone's output power before it is boosted, a variable gain element controlled by said gain controller for controlling the output power, at least one amplifier and a second directional coupler and detector which transmit a signal indicative of the output power after it is boosted to the gain controller, said gain controller capable of processing said signals to control the variable gain element on the receive side and the variable gain element on the transmit side.

2. A power boost system for enhancing communications between a cellular telephone handset and a network base station comprising a booster amplifier having:
   a. a receive side used to process and deliver to the handset signals received from the base station, said receive side including at least one amplifier and a gain element;
   b. a transmit side used to process and deliver to the base station signals from the handset, said transmit side having a variable gain element, at least one amplifier, a first sensor which senses the power of signals transmitted by the handset before they are boosted and a second sensor for sensing the power of such signals transmitted by the handset after they are boosted; and
   c. a gain controller for controlling the variable gain element of the transmit side to control the level to which such signals transmitted by the handset are boosted.

3. The power boost element of claim 2 wherein said gain element of the receive side is a variable gain element and is controlled by said gain controller so that the gain provided by the receive side mirrors the gain provided by the transmit side.

4. The power boost system of claim 2 wherein at least one of said first and second sensors comprises a directional coupler and a detector.

5. A power boost system for enhancing communications between a handset and a network base station of a cellular network comprising a booster amplifier having:
   a. at least one variable gain element controlled by a gain controller;
   b. at least one amplifier which cooperates with the variable gain element to boost the power of an input signal generated by the handset to provide an output signal to the network base station;
   c. a first sensor that sends messages to the gain controller indicative of the power of the input signal generated by the handset before it is boosted; and
   d. a second sensor that sends messages to the gain controller indicative of the power level of the signal generated by the handset after it is boosted; said gain controller dynamically adjusting the power of the output signal over a predetermined power leveling range.

6. The power boost system of claim 4 wherein the maximum power of the output signal is limited to a predetermined threshold.

7. The power boost system of claim 5 wherein said predetermined threshold is 2 watts.

8. The power boost system of claim 5 wherein the output signal is delivered at said predetermined threshold when the boost system is powered up and the gain controller then reduces the gain of the variable gain element to reduce the system gain in response to an increase in the power of the input signal.

9. A power boost system for enhancing communications between a cellular telephone handset and a network base station comprising a booster amplifier having:
   a. a receive side used to process and deliver to the handset signals received from the base station, said receive side including at least one amplifier and a gain element;
   b. a transmit side used to process and deliver to the base station signals from the handset, said transmit side having a variable gain element, at least one amplifier, a first sensor that senses the power of signals transmitted by the handset before they are boosted and a second sensor for sensing the power of such signals transmitted by the handset after they are boosted;
   c. a ground plane separating the transmit side from the receive side; and
   d. a gain controller for controlling the variable gain element of the transmit side to control the level to which such signals transmitted by the handset are boosted.

* * * * *